United States Patent
Nguyen et al.

(10) Patent No.: US 9,352,514 B2
(45) Date of Patent: May 31, 2016

(54) FUSELAGE MANDREL INSERT AND METHOD

(71) Applicant: The Boeing Company, Chicago, IL (US)

(72) Inventors: Loi K. Nguyen, Renton, WA (US); Jesse M. Havens, Asheboro, NC (US); Jean-Marc Morassutti, Bellevue, WA (US)

(73) Assignee: The Boeing Company, Chicago, IL (US)

( * ) Notice: Subject to any disclaimer, the term of this patent is extended or adjusted under 35 U.S.C. 154(b) by 223 days.

(21) Appl. No.: 13/921,595

(22) Filed: Jun. 19, 2013

(65) Prior Publication Data

US 2014/0374010 A1 Dec. 25, 2014

(51) Int. Cl.
| | |
|---|---|
| *B29C 70/02* | (2006.01) |
| *B29C 70/44* | (2006.01) |
| *B29C 33/38* | (2006.01) |
| *B29C 33/76* | (2006.01) |
| *B29C 33/40* | (2006.01) |
| *B29L 31/30* | (2006.01) |

(52) U.S. Cl.
CPC ............ *B29C 70/021* (2013.01); *B29C 33/38* (2013.01); *B29C 33/76* (2013.01); *B29C 70/446* (2013.01); *B29C 33/405* (2013.01); *B29L 2031/3082* (2013.01); *Y02T 50/433* (2013.01)

(58) Field of Classification Search
CPC .. B29C 70/021; B29C 70/446; B29C 33/405; B29C 33/76; B29C 33/38; B29L 2031/3082
USPC ............... 156/383, 156, 166, 443; 264/209.1; 269/21, 48, 47; 29/757, 790, 235, 787
See application file for complete search history.

(56) References Cited

U.S. PATENT DOCUMENTS

| | | | |
|---|---|---|---|
| 2010/0186899 A1* | 7/2010 | Jackson et al. ............... | 156/382 |
| 2013/0175749 A1* | 7/2013 | Hiken et al. .................. | 269/20 |

FOREIGN PATENT DOCUMENTS

WO 2008015115 A1 2/2008

OTHER PUBLICATIONS

EPO Search Report dated Nov. 27, 2014 for Application No. EP 14172795.8-1706.

* cited by examiner

*Primary Examiner* — Jacob T Minskey
*Assistant Examiner* — Vishal I Patel
(74) *Attorney, Agent, or Firm* — Smith Moore Leatherwood LLP; Thomas W. Epting; Matthew S. Bedsole

(57) ABSTRACT

An apparatus for use in formation of a composite structure about a mandrel. A generally flexible pneumatic tool and a generally rigid insert are inserted end to end in a cavity of the mandrel. A first end of the insert is positioned in the cavity, adjacent the pneumatic tool, and defines an interface therebetween. The retainer is connected to the insert proximate the first end of the insert. The retainer has an end that extends outwardly from the first end of the insert across the interface and over a portion of the end of the pneumatic tool. The uppermost surfaces of the insert, retainer, and pneumatic tool are generally flush with one another and facilitate a smooth surface being formed over such uppermost surfaces as the composite material is wound about the mandrel in the formation of the composite structure.

20 Claims, 7 Drawing Sheets

FUSELAGE MANDREL INSERT AND METHOD

FIELD

The present disclosure relates generally to configurations and methods for use in connection with the formation of a structure about a mandrel. More specifically, certain aspects of the disclosure relate to configurations and methods for formation of a composite fuselage component about a mandrel having an insert acting in cooperation with a pneumatic tooling element.

BACKGROUND

In the manufacture of components, and in particular composite components, wherein composite material is placed about a mandrel, maintenance of tolerances may be desired. In particular, in the formation of elongated composite components, it may be desirable to maintain certain flatness tolerances along a length and/or section of the elongated composite component. For example, in the manufacture of elongated fuselage sections, which are subsequently joined together end to end to form an airplane fuselage sections, it may be desirable to maintain certain flatness tolerances in troughs located between longitudinally extending inner structural members, or stringers. These troughs may receive, in some instances, splice elements which serve to bridge the interface between abutting fuselage sections and serve to join such sections to one another. If the desired flatness is not maintained during the formation of the fuselage sections on the mandrel, then rework, shimming, etc. may be required in the joining of adjacent fuselage sections to one another.

For example, certain composite fuselages may be fabricated using a mandrel with troughs running the length of the mandrel. The length of a trough may be filled with an inflatable pneumatic tool, or bladder. The bladder is flexible and not a hard tool surface. Therefore it may depress as a fiber placement machine compressively applies an application loading on the surface of the bladder during lay-up of the composite material on the mandrel. This may result in surface waviness in the finished composite structure. Specifically, the result may include the inner mold line (IML) at the ends of fuselage sections not meeting flatness tolerances at troughs. In such an event, subsequent post-cure works may be required at the ends of the fuselage sections to maintain or accommodate flatness tolerances.

Further limitations and disadvantages of conventional and traditional approaches to formation of fuselage sections and other elongated and/or composite components on a mandrel may become apparent to one of skill in the art, through comparison of such systems with teachings and examples set forth in the present disclosure.

SUMMARY

It would be desirable to provide a method and apparatus that address the issues discussed above, as well as other potential issues. Moreover, it would be beneficial to furnish a method and apparatus for facilitating maintenance of flatness tolerances in the manufacture of fuselage sections and other elongated and/or composite components on a mandrel.

Accordingly, methods and apparatuses are disclosed for facilitating such surface flatness substantially as shown in and/or described in connection with at least one of the figures, and as set forth more completely in the claims.

Examples of the present disclosure are generally directed to a method and apparatus for forming a composite structure using a mandrel. In one example implementation, an apparatus is disclosed for use in association with a flexible elongated pneumatic tool in a cavity of a mandrel used in the formation of an elongated composite structure, the pneumatic tool defining an end with an uppermost surface on which composite material is placed, and the mandrel also defining an end. The apparatus includes an insert having a first end and a second end generally opposite the first end, with the insert being generally rigid. The first end is configured to be positioned in the cavity and adjacent the pneumatic tool and for defining an interface therebetween. An elongated retainer is provided having a first end connected to the insert proximate the first end of the insert, and the retainer has a second end generally opposite of the first end that extends longitudinally outwardly from the first end of the insert across the interface and over a portion of the end of the pneumatic tool.

Such example implementation may include the retainer being constructed of a material which matches the thermal properties of the applied composite material and mandrel tool, which could be nickel iron alloy, such Invar. The retainer may define an uppermost surface and a second surface generally opposite the uppermost surface, with the second end of the retainer having an extreme end and with the second surface of the retainer being upwardly sloped towards the extreme end of the second end of the retainer.

In example implementations, the insert could be constructed of composite material and/or of substantially the same material as is the mandrel, and the second end of the insert could be positioned substantially adjacent the end of the mandrel, with the first end of the insert being substantially distal from the end of the mandrel. Also, the insert could define an uppermost surface and a lower surface, and the uppermost surface of the insert could define a recess that receives the retainer, such that the uppermost surface of the insert adjacent the recess is substantially flush with the uppermost surface of the retainer.

In another example implementation, a method of forming an elongated composite structure is disclosed using a mandrel employing a pneumatic tool, and the method can include providing an elongated pneumatic tool and a generally rigid elongated insert, the pneumatic tool being generally flexible, and the insert having a first end with a cantilevered retainer extending therefrom. The method further includes: inserting the pneumatic tool into a mandrel cavity; inserting the retainer into a mandrel cavity such that the first end of the insert is adjacent an end of the pneumatic tool and the retainer extends over the end of the pneumatic tool; and applying composite material to the mandrel, the pneumatic tool, and the retainer to form the composite structure.

A method may further include, after the applying of the composite material to or about the pneumatic tool, inflating the pneumatic tool to compress the composite material applied thereto. Additionally, the method may include, after the applying of the composite material to the pneumatic tool and the insert, longitudinally removing the pneumatic tool and the insert from the mandrel cavity. The method may also include the inserting of the retainer into the mandrel cavity including positioning a second end of the insert adjacent an end of the mandrel. Moreover, the method may include, after the applying of the composite material to the pneumatic tool and curing the composite material, which in one example could be through use of an autoclave (not shown).

In yet another example implementation, an apparatus for forming an elongated composite structure is disclosed having an elongated mandrel defining a cavity and at least one flexible elongated pneumatic tool that is inserted in the cavity. The pneumatic tool is generally flexible, and at least one elongated insert is inserted in the cavity, with the insert being generally rigid. The insert has a first end and a second end generally opposite the first end and is configured to be positioned in the cavity adjacent the pneumatic tool and for defining an interface therebetween. An elongated retainer, having a first end connected to the insert proximate the first end of the insert, is provided, and the retainer has a second end generally opposite of the first end that extends longitudinally outwardly from the first end of the insert across the interface and over a portion of the end of the pneumatic tool.

Such apparatus may include the end of the pneumatic tool defining a sloped upper surface portion and an uppermost portion generally adjacent the sloped upper surface portion, with the retainer defining an uppermost surface and a second surface generally opposite the uppermost surface. The second end of the retainer has an extreme end, and the second surface of the retainer is upwardly sloped towards the extreme end of the second end of the retainer, with the second surface of the retainer extending adjacent the sloped uppermost surface portion of the pneumatic tool.

The apparatus may further include the insert defining an uppermost surface and a lower surface, with the uppermost surface of the insert defining a recess that receives the retainer and the uppermost surface of the insert adjacent the recess being substantially flush with the uppermost surface of the retainer, and the uppermost surface of the retainer being substantially flush with the uppermost surface of the pneumatic tool.

Furthermore, the apparatus may include a combination wherein the end of the pneumatic tool defines a sloped upper surface portion and an uppermost portion generally adjacent the sloped upper surface portion, with the retainer defining an uppermost surface and a second surface generally opposite the uppermost surface. The second end of the retainer may have an extreme end, and the second surface of the retainer may be upwardly sloped towards the extreme end of the second end of the retainer, with the second surface of the retainer extending adjacent the sloped uppermost surface portion of the pneumatic tool. The insert may define an uppermost surface and a lower surface, with the uppermost surface of the insert defining a recess that receives the retainer, and the uppermost surface of the insert adjacent the recess being substantially flush with the uppermost surface of the retainer, and the uppermost surface of the retainer being substantially flush with the uppermost surface of the pneumatic tool.

Examples of the present disclosure are generally directed to configurations and methods for use in connection with the formation of a structure about a mandrel. Generally, in an example implementation, a device is disclosed for use in the formation of a composite component about a mandrel.

In other exemplary aspects of the disclosure, methods and apparatuses are provided for formation of a composite component about a mandrel having a generally rigid elongated insert acting in cooperation with one or more pneumatic tooling element.

Exemplary implementations of the instant disclosure may provide methods and configurations to locate and retain a pneumatic tooling component, or bladder, within a correspondingly shaped tooling mold cavity within a mandrel tool. Additionally, such methods and configurations may allow for maintenance of mold line height alignment with respect to adjacent tool surfaces and thereby reduce the need for alignment and perhaps the use of interface shimming to maintain such alignment.

More specifically, methods and configurations of exemplary implementations may provide a base composite insert, or plug, conformed, or conformable, to the profile of an associated mandrel cavity. The retainer, which in an example implementation could be constructed of a material matching the base mandrel thermal mechanical properties, such as Invar, is provided on the insert. The insert in an exemplary implementation may be formed of a material generally matching or approximating the material of the mandrel, and in the case of a composite material mandrel, the insert could likewise be made of the same or similar composite material as the mandrel, such that the thermal expansion growth of the insert and mandrel match or approximate one another.

In an example implementation, as noted above, the retainer is positioned to extend out past the end of the insert. The extended end of the retainer is tapered in a predetermined manner such that the assembled pneumatic tooling component, or pneumatic tool, when slid under the tapered extended end at assembly, bridges the gap between the insert and the pneumatic tool and fixes the pneumatic tool into location in the mandrel cavity. Additionally, as a result of the use of the insert, the configuration may provide a non-distortional initial starting surface on top of the generally rigid elongated insert for fiber placement about the mandrel surface during buildup of the composite lamina assembly, or structure, which, in one implementation, could be an aircraft fuselage section.

The insert may be introduced into mandrel cavities during formation of elongated support members, or stringers, of an elongated composite structure. In one implementation, after formation of the composite structure, a pneumatic tool may be longitudinally withdrawn from a trough formed in the composite structure. The insert may be placed adjacent to the end of the pneumatic tool prior to the buildup of the composite material on the mandrel. Use of the insert in this manner may result in a more consistent tool surface and a relatively smooth mold line height. It may also reduce or eliminate, after curing of the elongated composite structure in an autoclave or other curing environment, post-cure rework of the troughs or other affected areas, potentially allowing for production rate improvement and for the assembly of adjacent composite structures, such as fuselage sections, without secondary shimming.

The features, functions and advantages discussed herein may be achieved independently in various examples or may be combined in yet other exemplary aspects of the disclosure, the further details of which may be seen with reference to the following description and drawings.

BRIEF DESCRIPTION OF THE DRAWINGS

Figure 1:
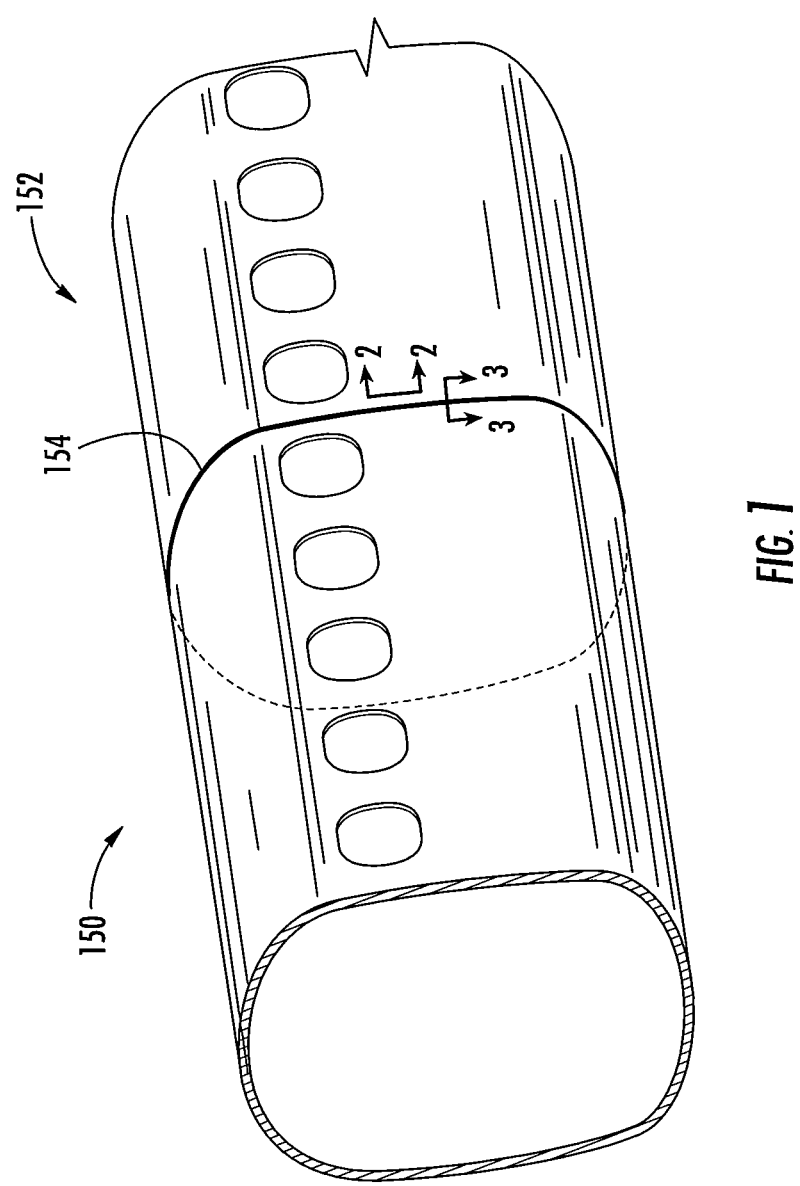
Figure 2:
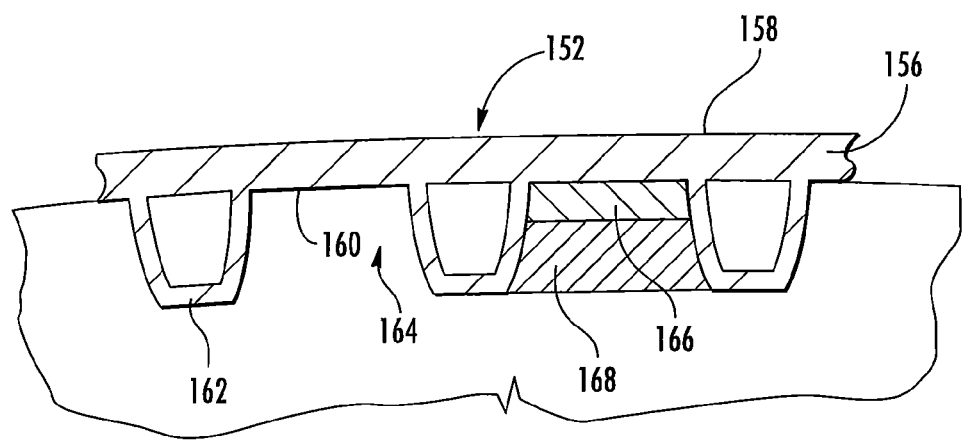
Figure 3:
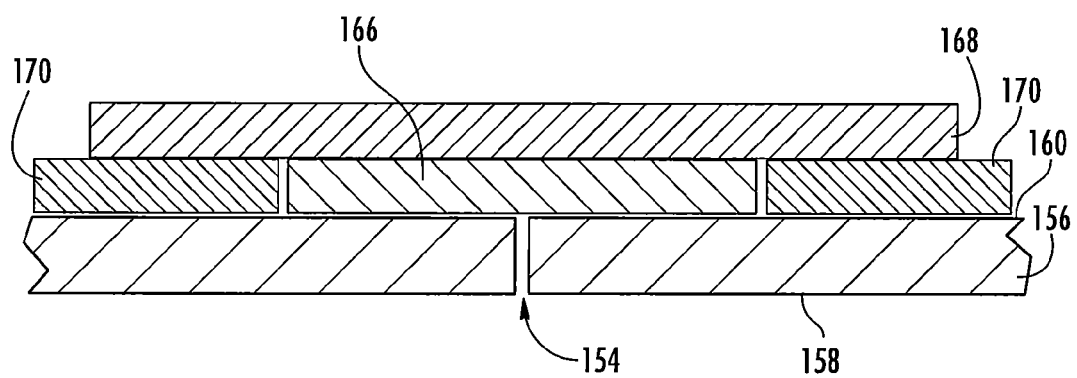
Figure 4:
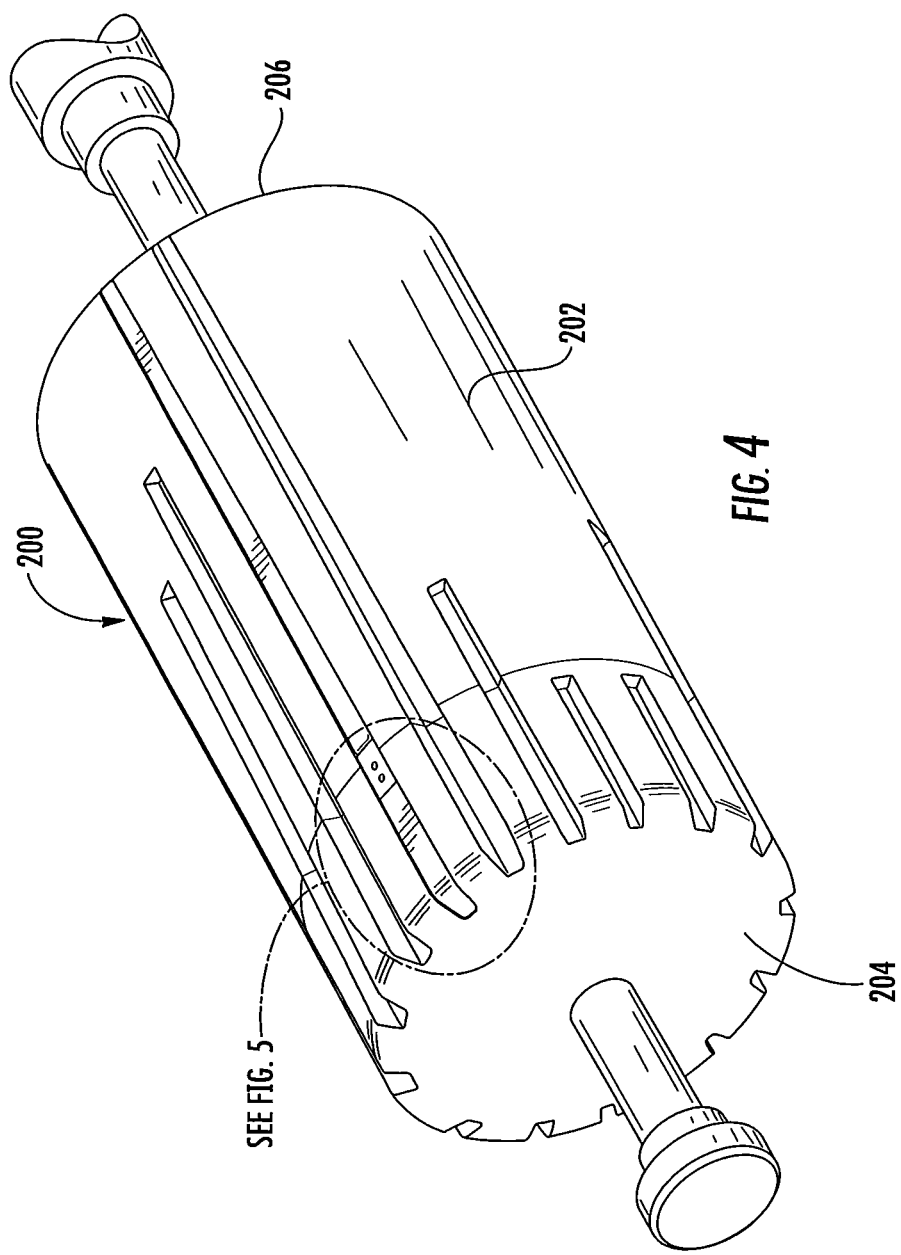
Figure 5:
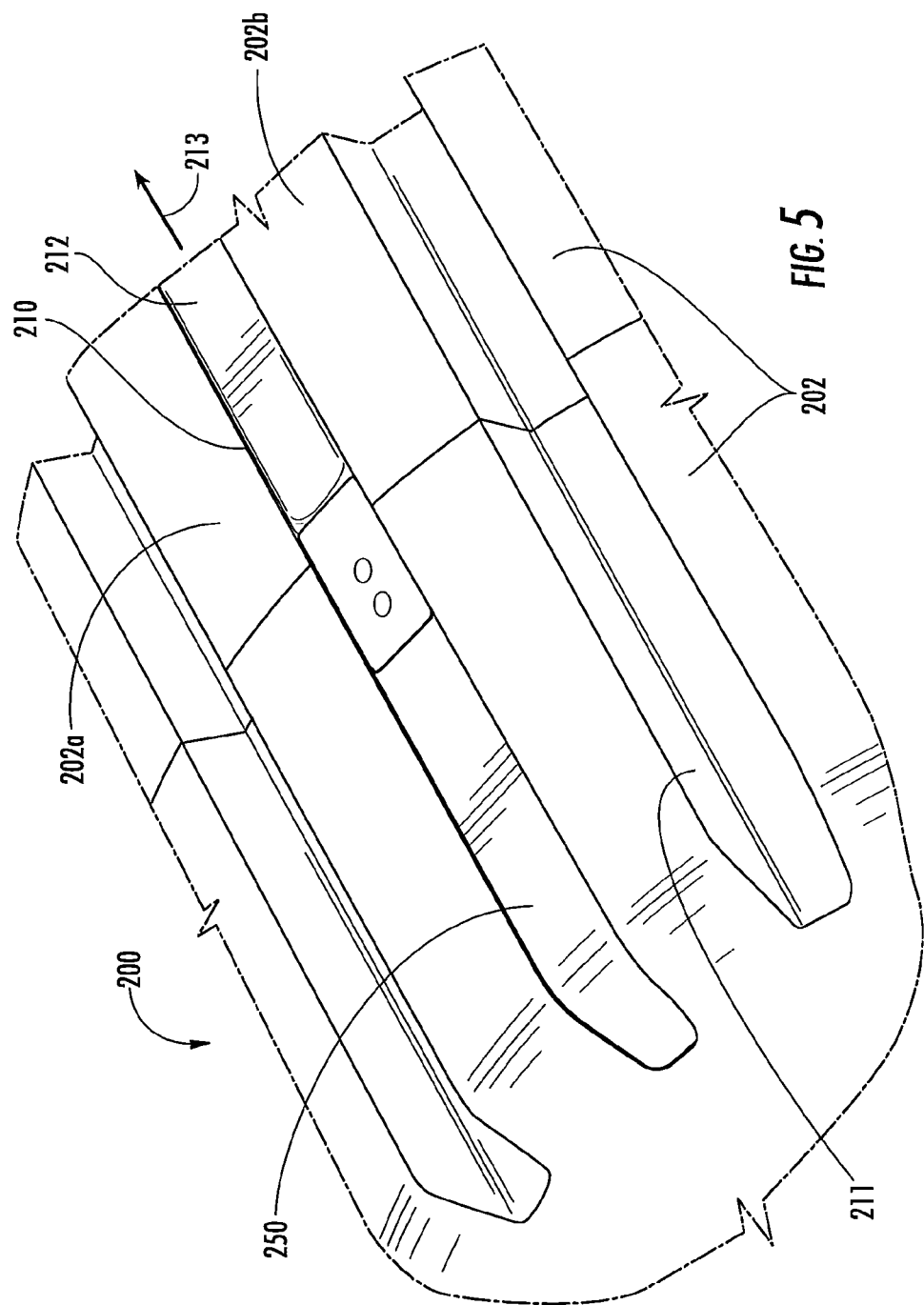
Figure 6:
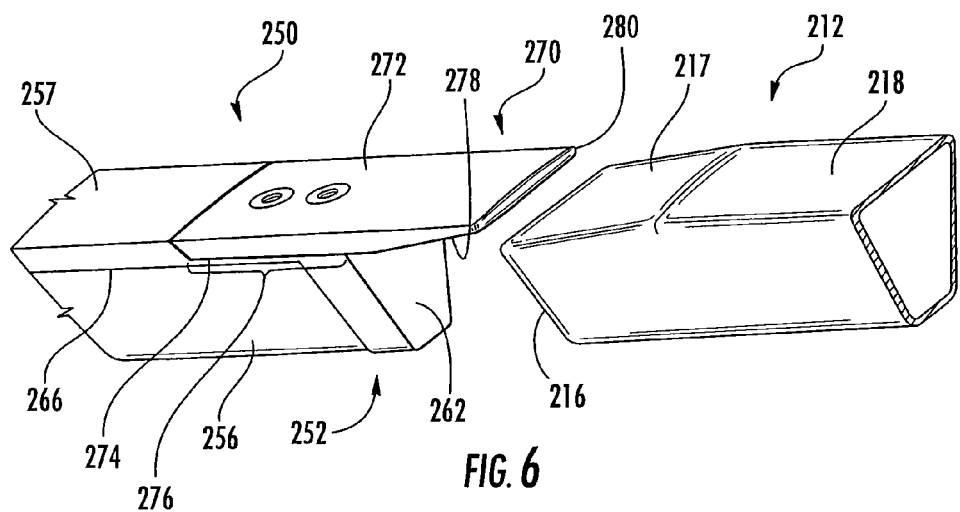
Figure 7:
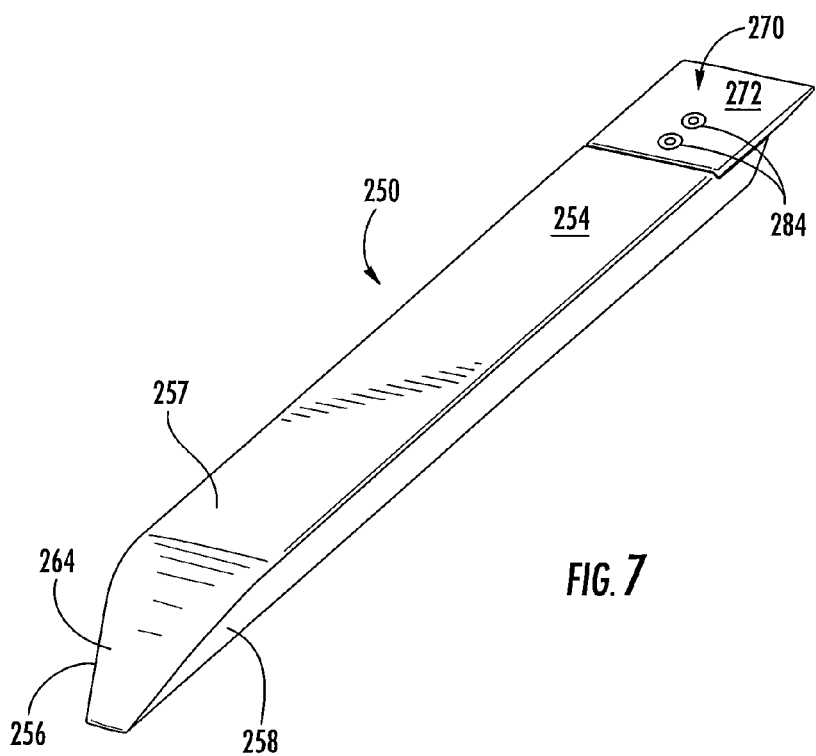
Figures 8, 9:
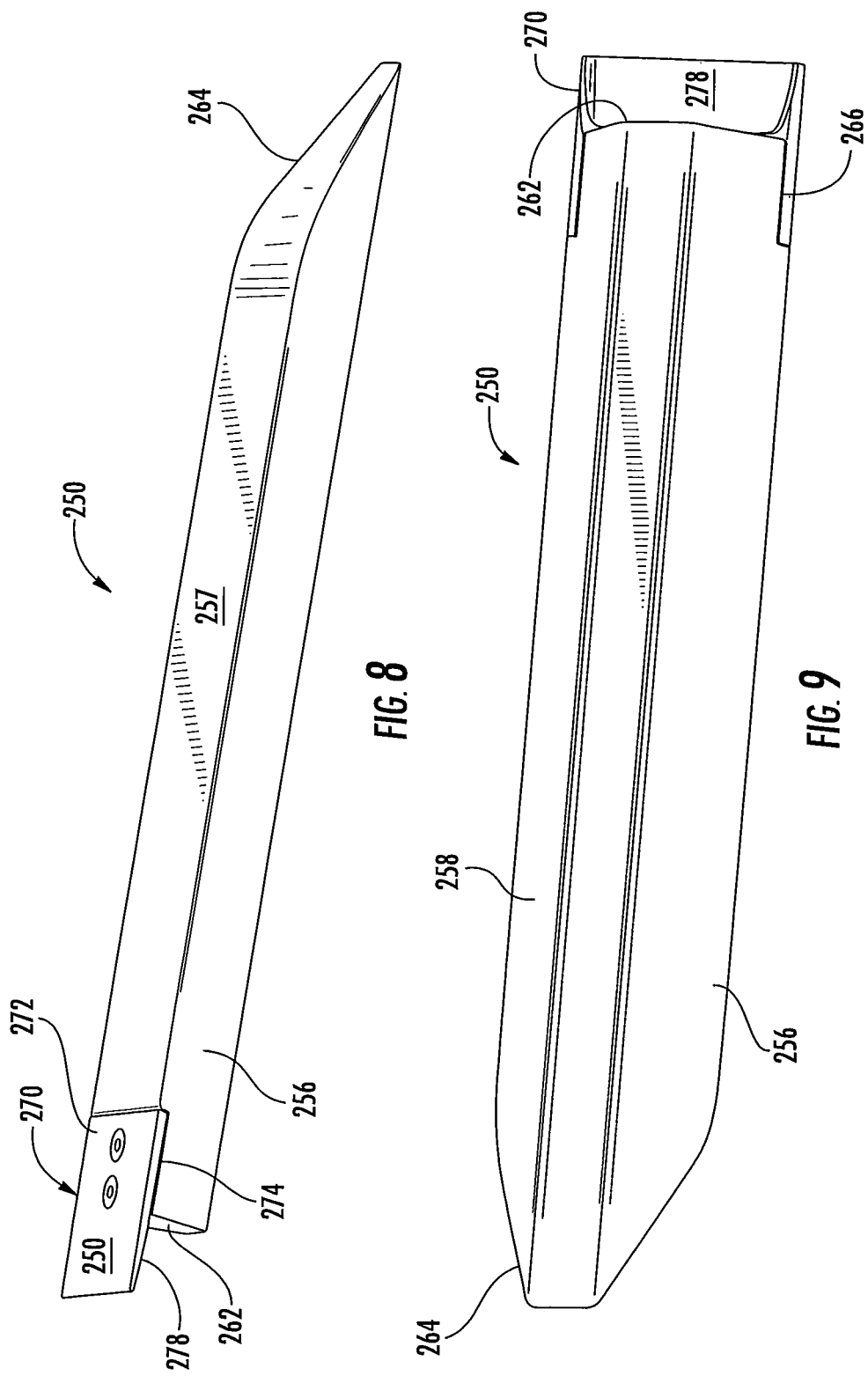
Figure 10:
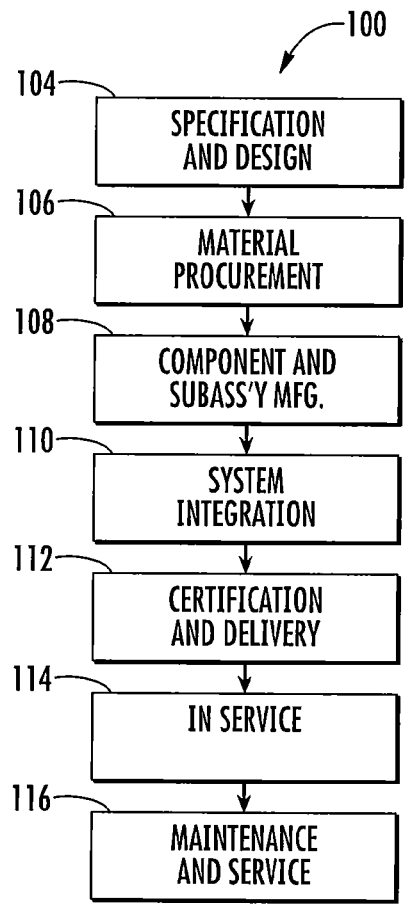

Having thus described exemplary aspects of the disclosure in general terms, reference will now be made to the accompanying drawings, which are not necessarily drawn to scale, and wherein:

FIG. 1 illustrates a side elevational view of two example fuselage sections formed using a mandrel and joined together;

FIG. 2 is a section view taken along lines 2-2 of FIG. 1;

FIG. 3 is a section view taken along lines 3-3 of FIG. 1;

FIG. 4 illustrates and example mandrel about which composite material may be wound to produce an elongated composite component, such as, but not limited to, a fuselage section;

FIG. 5 illustrates in a sectional view the example apparatus for positioning a processing system shown in FIG. 4;

FIG. 6 illustrates an example implementation of the present disclosure, namely, a mandrel insert, or plug, having a retainer for use in association with a pneumatic tool, or bladder;

FIG. 7 illustrates in a perspective view the example mandrel insert shown in FIG. 5;

FIG. 8 illustrates in a perspective view the example mandrel insert shown in FIG. 5;

FIG. 9 illustrates in a bottom plan view the example mandrel insert shown in FIG. 5;

FIG. 10 is a flow diagram of aircraft production and service methodology; and

Figure 11:
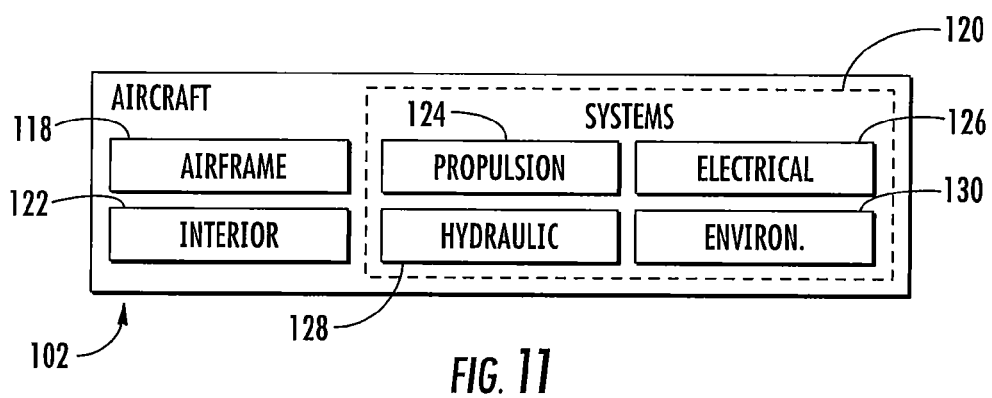

FIG. 11 is a block diagram of an aircraft.

DETAILED DESCRIPTION

Examples of the present disclosure will now be described more fully hereinafter with reference to the accompanying drawings, in which some, but not all examples of the disclosure are shown. Indeed, various exemplary aspects of the disclosure may be embodied in many different forms and should not be construed as limited to the examples set forth herein. Rather, these examples are provided so that this disclosure will be thorough and complete and will fully convey the scope of the disclosure to those skilled in the art. Like reference numerals refer to like elements throughout.

As used herein, "and/or" means any one or more of the items in the list joined by "and/or." As an example, "x and/or y" means any element of the three-element set {(x), (y), (x, y)}. As another example, "x, y, and/or z" means any element of the seven-element set {(x), (y), (z), (x, y), (x, z), (y, z), (x, y, z)}. Further, as used herein, the term "exemplary" means serving as a non-limiting example, instance, or illustration. Moreover, as used herein, the term, for example, or "e.g.," introduces a list of one or more non-limiting examples, instances, or illustrations.

As discussed below, examples of the present disclosure include methods and apparatuses are provided for formation of a composite component about a mandrel having a generally rigid elongated insert acting in cooperation with a pneumatic tooling element.

Generally, the subject matter described herein relates generally to use of an insert for a mandrel used to form elongated composite structures and, more particularly, to an insert for use in association with a pneumatic tooling elements. The insert component in an exemplary implementation is made of a material, such as a composite or other material, to approximate or match the material that the mandrel is made of, such when the mandrel and component formed thereon are placed in an autoclave or other high temperature environment, should the insert grow, it may grow at approximately the rate as the adjacent mandrel surfaces. The mandrel itself may be made of a composite material. The retainer attaches directly to the insert, and gives a generally continuous surface extending the interface between the insert and adjacent pneumatic tooling element and mandrel surfaces. As such, use of the insert and retainer described herein facilitates maintaining flatness tolerances during the formation of fuselage sections and may reduce rework, shimming, etc. that may otherwise be required may be required, thereby potentially reducing delays, production disruptions, costs, and/or manpower requirements.

Referring to one example implementation of the present disclosure, turning to FIG. 1, elongated composite structures, such as aircraft fuselage sections, generally, 150 and 152, are shown attached to one another in an abutting relationship at interface 154. While the elongated composite structures are shown herein as aircraft fuselage sections, it is to be understood that such structures could also be those such as may be used in commercial, industrial, governmental, and/or defense, etc. sectors, and more particularly could be used in configurations for automotive, maritime, submarine, spacecraft, train, subway, amusement ride, elevator, building construction, vehicles, equipment, missiles, housing, drones, and/or sewer, etc. applications.

FIGS. 2 and 3 show sectional views, (2-2), (3-3), of the fuselage sections 150 and 152 of FIG. 1 of interface 154. Specifically, FIG. 2 is transverse cross-section of fuselage section 152 and schematically shows the outer wall, or skin, 156 of fuselage section 152, having outer surface 158 and inner surface 160. Longitudinally extending members, or stringers, generally 162, are shown as are also longitudinally extending troughs, generally, 164, interposed therebetween. In an example implementation, a splice strap 166 (FIG. 3) used in connecting adjacent fuselage sections 150 and 152 together is carried within trough 164 and carried on top of splice strap 166 is an elongated splice 168, which bridges interface 154 and acts as a structural member that secures and transmits loads between fuselage sections 150 and 152.

FIG. 3 is a longitudinal section view of troughs 164 adjacent interface 154 between fuselage sections 150 and 152. Splice 168 is shown spanning interface 154 and bearing on splice strap 166, which also spans across interface 154. Positioned at each end of splice 168 are filler strips 170, which are carried in the troughs 16 of each fuselage section 150 and 152. If inner surface 160 is not within flatness tolerances, shims (not shown) and/or rework may be necessary in order for filler strips 170, splice strap 166, and splice 168 to be within tolerance for properly joining fuselage sections 150 and 152 together. It is noted that although only one combination of filler strips 170, splice strap 166, and splice 168 arrangement is shown, multiple such combinations can be placed about the periphery of fuselage sections 150 and 152 at interface 154 if necessary or otherwise desired.

FIG. 4 illustrates a mandrel, generally 200, about which an elongated composite structure may be formed by the placing of composite material, such as wall 156 of fuselage section 152, about the surface 202 of mandrel 200. Mandel 200 includes a first end 204 and a second end 206 opposite first end 204. Mandrel 200, in an example implementation, is also made of composite material, although it could also be made of any other suitable material.

As shown in FIG. 5, prior to placing composite material about the circumference on uppermost surface 202 of mandrel 200, at least one cavity 210 is provided with at least one generally flexible elongated pneumatic tool, or bladder, 212, which is inflatable. Ribs 211 are also provided on mandrel 200. Flexible elongated pneumatic tool, or bladder, 212 is provided in longitudinally extending mandrel cavity 210 in a manner such that it may be withdrawn longitudinally from cavity 210 after an elongated composite structure has been formed and, in an example implementation, after curing of the composite structure. Bladder 212 is pulled or otherwise withdrawn out of cavity 210 by pulling bladder 212 in a direction towards the right, as shown by arrow 213 in FIG. 5.

As shown in FIG. 6, bladder 212 includes, in an example implementation, a generally vertical end 216 having a generally tapered top surface portion 217 that terminates in a generally horizontal uppermost top surface 218. During the placement of composite material about surface 202 of mandrel 200, top surface 218 of bladder 212 is inflated in a manner such that top surface 218 is maintained generally flush with, and at substantially the same elevation as, surfaces 202a and 202b of mandrel 200 (FIG. 5).

FIGS. 6-9 illustrate a generally rigid elongated insert, generally, 250 in accordance with an example implementation of the present disclosure. Insert 250 is an elongated member configured to conform to and be received in elongated cavity 210 adjacent bladder 212. Specifically, insert 250 is placed in mandrel cavity 210 at the end of mandrel 200 such that insert 250 is at the extreme end of at least one end of the elongated composite structure, or, fuselage section being formed on mandrel 200. Thus, the insert is positioned such that the composite material placed on top of it will ultimately be the inner surface 160 (FIG. 3) of a fuselage section location where the splice strap 166 and splice 168 will be inserted, i.e., the 160 surface portion where in-tolerance flatness is most desirable.

As shown in FIG. 6, insert 250 includes a first end 252 and a second end opposite first end 252. Insert 250 includes a first longitudinally extending side 256 and a second longitudinally extending side 258 (FIG. 7) generally opposite side 256. Insert 250 also includes a longitudinally extending flat uppermost surface 257 (FIG. 8). First end 252 has a generally vertical surface portion 262 which, when insert 250 is inserted in cavity 210, is adjacent to generally vertical end 216 (FIG. 6) of bladder 212 in a close or abutting relationship. As shown in FIG. 7, second end 264 of insert 250 is downwardly tapered to a nose portion 254. The uppermost surface of insert 250 at first end 252 includes a recess 266 (FIG. 6) which receives a retainer, generally 270.

Retainer 270 has a generally flat top, or uppermost, surface 272, that is flush with top surface 257 of insert 250, and a lower surface 274 with a relatively flat portion 276 that rests in recess 266 of insert 250. Retainer 270 has a sloped, or tapered, surface 278 extending from surface 276 that terminates at an extreme, or distal, end 280 of retainer 270. Retainer 270 may be removably attached to insert 250 using fasteners 284, which could be screws, bolts, pins, etc. The ability to remove retainer 270 allows maintenance and replacement thereof if need be. FIGS. 8 and 9 provide full-length views of insert 250 and retainer 270 from different angles.

Upon insert 250 and bladder 212 being in cavity 210 in an end-to-end relationship and defining an interface therebetween, the tapered surface 278 of retainer 270 extends over and adjacent sloped, or tapered, top surface portion 217 of bladder 212 in a cooperating, generally parallel relationship. Upper surface 272 of retainer 270 is generally flush with top surface 218 of bladder 212 to provide a smooth surface transition from the top surfaces 257 of insert 250, to top surface 272 of retainer 270, to top surface 218 of bladder 212. This smooth surface transition of the top surfaces allows for a smooth lay-up of composite material about the top surfaces and adjacent mandrel surfaces 202a and 202b, thereby facilitating the inner surfaces 160 of fuselage sections 150 and 152 meeting flatness tolerances and ultimately minimizing rework and/or shimming during the joining of adjacent fuselage sections 150 and B. Another aspect of retainer 270 is that it completely spans the width of the cavity 211 leaving little to almost no crevasse for composite material to fill in and thus create ridges during composite lay-up.

Insert 250 can be retrofit and/or installed into production mandrels. Once installed, the insert 250, being generally rigid, would act as relatively hard tool surface and may be at nominal height relative to adjacent tool surfaces after thermal growth is accounted for.

Although a number of materials could be used, insert 250 could be a composite material, and is configured to have a thermal growth rate the same or similar to mandrel 200. Retainer 270 could be of a number of different materials, and in one example may be Invar. In one example, the composite lay-up orientation of insert 250 will be made such that thermal growth will be minimal in the Z-direction (the direction into or out of the page towards the viewer with respect to the drawings).

During lay-up of the composite on mandrel 200, the composite material covers the top surface 218 of bladder 212. Upon the mandrel and fuselage section being built thereon and placed in the autoclave (not shown), or otherwise cured, bladder 212 can inflate and compress the material in the fuselage section wound on mandrel 200 to help compress the composite material inside a particular trough.

In an example implementation, upon the winding around the mandrel, the outer circumference of the structure is being wound may be the outer skin of the fuselage section. With respect to the inner portion of what is being wound, structural components such as stringers may be desired. The stringers may be formed through hard contact surfaces and bladders that allow for modification of the specific string/trough arrangement that is need for a particular application.

In operation, at least one bladder 212 is inserted in a cavity 211 of mandrel 200, and an insert 250 is inserted in the same cavity, such that end of the insert is adjacent the end of the bladder, and retainer 270 extends over the tapered upper surface 217. Composite material is wound about the surface of the mandrel to a predetermined thickness and configuration as desired for the composite structure being formed, such as a fuselage section. Once the composite is built up sufficiently, the mandrel is pulled out longitudinally. The bladders and inserts in mandrel cavities 210 are ultimately removed from mandrel 200 longitudinally.

In an example implementation, bladder 212 does not extend all the way to an end 204, 206 of mandrel 200, as composite winding loads against the bladder during lay-up of the composite material would potentially deform and/or deflect the bladder tooling. The result may be that instead of the composite material being formed on top of the bladder being a smooth surface within flatness tolerances, such surface may instead have a wavy surface out of flatness tolerances. Thus, when adjacent fuselage sections are joined together, they may require shimming and/or rework in order to be attached to one another. Accordingly, at the end portion of the fuselage section that is going to receive a splice, a tight, smooth tolerance surface is needed. Accordingly, an insert 250 is preferably used in the corresponding portion of the mandrel on which the end of the fuselage section is to be formed.

Although only one insert 250 is shown in the drawings as being associated with bladder 212 and mandrel 200, it is to be understood that multiple inserts 250 could be used in mandrel 200 and/or in association with one or more pneumatic tools 212, if desired.

Examples of the present disclosure may be described in the context of an aircraft manufacturing and service method, generally depicted as 100, shown schematically in FIG. 10, and an aircraft, generally depicted as 102, shown schematically in FIG. 11, with the functions of service method 100 and construction of aircraft 102 being depicted as blocks and/or modules in such figures. During pre-production, exemplary method 100 may include specification and design 104 of the aircraft 102 and material procurement 106. During production, component and subassembly manufacturing 108 and system integration 110 of the aircraft 102 takes place. Thereafter, the aircraft 102 may go through certification and delivery 112 in order to be placed in service 114. While in service by a customer, the aircraft 102 is scheduled for routine maintenance and service 116 (which may also include modification, reconfiguration, refurbishment, and so on).

Each of the processes of method 100 may be performed or carried out by a system integrator, a third party, and/or an operator (e.g., a customer). For the purposes of this description, a system integrator may include, without limitation, any number of aircraft manufacturers and major-system subcontractors; a third party may include without limitation any number of venders, subcontractors, and suppliers; and an operator may be an airline, leasing company, military entity, service organization, and so on.

As shown in FIG. 11, the aircraft 102 produced by exemplary method 100 may include an airframe 118 with a plurality of systems 120 and an interior 122. Examples of high-level systems 120 include one or more of a propulsion system 124, an electrical system 126, a hydraulic system 126, and an environmental system 130. Any number of other systems may be included. Although an aerospace example is shown, the principles of the invention may be applied to other industries, such as the automotive industry.

Apparatus and methods embodied herein may be employed during any one or more of the stages of the production and service method 100. For example, components or subassemblies corresponding to the production process stage 108 may be fabricated or manufactured in a manner similar to components or subassemblies produced while the aircraft 102 is in service. Also, one or more apparatus examples, method examples, or a combination thereof may be utilized during the production stages 108 and 110, for example, by substantially expediting assembly of or reducing the cost of an aircraft 102. Similarly, one or more of apparatus examples, method examples, or a combination thereof may be utilized while the aircraft 102 is in service, for example and without limitation, for maintenance and service 116.

The present disclosure is applicable in the context of manufacturing an air craft 102 and service method 100, and/or in other manufacturing sectors, such as the automotive sector, space sector, heavy industry sector, surface and submarine vessel maritime sector, etc.

Exemplary implementations of systems and methods for using an insert and pneumatic tool are described above in detail. The systems and methods are not limited to the specific implementations described herein, but rather, components of systems and/or steps of the method may be utilized independently and separately from other components and/or steps described herein. The disclosed dimensional ranges include all sub ranges there between. Further, the insert, retainer, and pneumatic tool may be fabricated from any material that enables them to function as described herein. Each component and each method step may also be used in combination with other components and/or method steps. Although specific features of various implementations may be shown in some drawings and not in others, this is for convenience only. Any feature of a drawing may be referenced and/or claimed in combination with any feature of any other drawing.

Many modifications and other exemplary aspects of the disclosure set forth herein will come to mind to one skilled in the art to which this disclosure pertains, having the benefit of the teachings presented in the foregoing descriptions and the associated drawings. Therefore, it is to be understood that the disclosure is not to be limited to the specific examples disclosed and that modifications and other exemplary aspects of the disclosure are intended to be included within the scope of the appended claims. Moreover, although the foregoing descriptions and the associated drawings illustrate examples in the context of certain example combinations of elements and/or functions, it should be appreciated that different combinations of elements and/or functions may be provided by alternative examples without departing from the scope of the appended claims. For instance, different combinations of elements and/or functions than those explicitly described above are also contemplated as may be set forth in the appended claims. Although specific terms are employed herein, they are used in a generic and descriptive sense only and not for purposes of limitation.

What is claimed is:

1. A method of forming an elongated composite structure using a mandrel employing a pneumatic tool, the method comprising:
   providing at least one flexible elongated pneumatic tool defining a generally vertical end having a generally tapered top surface portion that terminates in a generally horizontal uppermost top surface;
   providing at least one elongated insert having a first end defining a generally vertical surface portion and having a cantilevered retainer extending therefrom, the insert being generally rigid;
   inserting the elongated pneumatic tool into a mandrel cavity;
   inserting the insert into the mandrel cavity such that the generally vertical surface portion of the first end of the insert is adjacent the generally vertical end of the elongated pneumatic tool and the retainer extends over the end of the elongated pneumatic tool to place the generally vertical surface portion of the first end of the insert in a close or abutting relationship with the generally vertical end of the flexible elongated pneumatic tool; and
   applying composite material to the mandrel, the pneumatic tool, and the retainer to the elongated composite structure.

2. The method of claim 1, further comprising:
   after the applying of the composite material to the pneumatic tool, inflating the elongated pneumatic tool to force a portion of the pneumatic tool and the composite material applied thereto away from the mandrel cavity.

3. The method of claim 1, further comprising:
   after the applying of the composite material to the pneumatic tool and the insert, longitudinally removing the pneumatic tool and the insert from the mandrel cavity.

4. The method of claim 1, further comprising:
   the inserting of the retainer into the mandrel cavity including positioning a second end of the insert adjacent an end of the mandrel.

5. The method of claim 1, further comprising:
   after the applying of the composite material to the pneumatic tool and the insert, placing the mandrel in an autoclave to cure the composite material.

6. The method of claim 1, further comprising:
   after the applying of the composite material to the pneumatic tool and the insert, curing the composite material.

7. The method of claim 1, further comprising:
   after the applying of the composite material to the pneumatic tool, inflating the elongated pneumatic tool to force a portion of the pneumatic tool and the composite material applied thereto away from the mandrel cavity; and
   after the applying of the composite material to the pneumatic tool and the insert, longitudinally removing the pneumatic tool and the insert from the mandrel cavity.

8. The method of claim 7, further comprising:
   the inserting of the retainer into the mandrel cavity including positioning a second end of the insert adjacent an end of the mandrel.

9. The method of claim 8, further comprising:
after the applying of the composite material to the pneumatic tool and the insert, placing the mandrel in an autoclave to cure the composite material.

10. The method of claim 9, further comprising:
after the applying of the composite material to the pneumatic tool and the insert, curing the composite material.

11. A method of forming an elongated composite structure using a mandrel employing a pneumatic tool, the method comprising:
providing at least one flexible elongated pneumatic tool defining a generally vertical end having a generally tapered top surface portion that terminates in a generally horizontal uppermost top surface;
providing at least one elongated insert having a first end defining a generally vertical surface portion and having a cantilevered retainer extending therefrom, the insert being generally rigid;
inserting the elongated pneumatic tool into a mandrel cavity;
inserting the insert into the mandrel cavity such that the generally vertical surface portion of the first end of the insert is adjacent the generally vertical end of the elongated pneumatic tool and the retainer extends over the end of the elongated pneumatic tool to place the generally vertical surface portion of the first end of the insert in a close or abutting relationship with the generally vertical end of the flexible elongated pneumatic tool;
applying composite material to the mandrel, the pneumatic tool, and the retainer to form the elongated composite structure;
inflating the elongated pneumatic tool to force a portion of the pneumatic tool and the composite material applied thereto away from the mandrel cavity; and
curing the composite material after the applying of the composite material to the pneumatic tool and the insert.

12. The method of claim 11, further comprising:
after the applying of the composite material to the pneumatic tool and the insert, longitudinally removing the pneumatic tool and the insert from the mandrel cavity.

13. The method of claim 11, further comprising:
the inserting of the retainer into the mandrel cavity including positioning a second end of the insert adjacent an end of the mandrel.

14. The method of claim 11, further comprising:
the curing of the composite material including placing the mandrel in an autoclave.

15. A method of forming an elongated composite structure using a mandrel employing a pneumatic tool, the method comprising:
providing at least one flexible elongated pneumatic tool defining a generally vertical end having a generally tapered top surface portion that terminates in a generally horizontal uppermost top surface;
providing at least one elongated insert having a first end defining a generally vertical surface portion and having a cantilevered retainer extending therefrom, the insert being generally rigid;
inserting the elongated pneumatic tool into a mandrel cavity;
inserting the insert into the mandrel cavity such that the generally vertical surface portion of the first end of the insert is adjacent the generally vertical end of the elongated pneumatic tool and the retainer extends over the end of the elongated pneumatic tool to place the generally vertical surface portion of the first end of the insert in a close or abutting relationship with the generally vertical end of the flexible elongated pneumatic tool;
applying composite material to the mandrel, the pneumatic tool, and the retainer to form the elongated composite structure; and
longitudinally removing the insert from the mandrel cavity after the applying of the composite material to the insert.

16. The method of claim 15, further comprising:
after the applying of the composite material to the pneumatic tool, inflating the elongated pneumatic tool to force a portion of the pneumatic tool and the composite material applied thereto away from the mandrel cavity.

17. The method of claim 15, further comprising:
the inserting of the retainer into the mandrel cavity including positioning a second end of the insert adjacent an end of the mandrel.

18. The method of claim 15, further comprising:
after the applying of the composite material to the pneumatic tool and the insert, placing the mandrel in an autoclave to cure the composite material.

19. The method of claim 15, further comprising:
after the applying of the composite material to the pneumatic tool and the insert, curing the composite material.

20. The method of claim 15, further comprising:
longitudinally removing the pneumatic tool from the mandrel cavity after the applying of the composite material to the pneumatic tool.

* * * * *